United States Patent
Tsen et al.

(10) Patent No.: US 8,108,060 B2
(45) Date of Patent: Jan. 31, 2012

(54) SYSTEM AND METHOD FOR IMPLEMENTING A WAFER ACCEPTANCE TEST ("WAT") ADVANCED PROCESS CONTROL ("APC") WITH NOVEL SAMPLING POLICY AND ARCHITECTURE

(75) Inventors: Andy Tsen, Chung-Ho (TW); Jo Fei Wang, Hsin-Chu (TW); Po-Feng Tsai, Taipei (TW); Ming-Yu Fan, Hsinchu County (TW); Jill Wang, Hsinchu (TW); Jong-I Mou, Hsinpu Township, Hsinchu County (TW); Sunny Wu, Zhudong Town (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 315 days.

(21) Appl. No.: 12/465,064

(22) Filed: May 13, 2009

(65) Prior Publication Data

US 2010/0292824 A1 Nov. 18, 2010

(51) Int. Cl.
*G06F 19/00* (2006.01)
*G06F 17/18* (2006.01)
*G06F 11/30* (2006.01)
*G01N 37/00* (2006.01)

(52) U.S. Cl. ........ 700/108; 700/103; 700/105; 700/121; 702/81; 702/82; 702/83; 702/84; 702/179; 702/181; 702/182; 702/183; 702/184; 702/185

(58) Field of Classification Search ............... 700/103, 700/105, 108, 121; 702/81–84, 179, 181–185
See application file for complete search history.

(56) References Cited

U.S. PATENT DOCUMENTS

| | | | |
|---|---|---|---|
| 6,631,299 B1* | 10/2003 | Patel et al. | 700/37 |
| 7,650,199 B1* | 1/2010 | Kadosh | 700/121 |
| 2002/0147960 A1* | 10/2002 | Jevtic et al. | 716/19 |
| 2005/0033467 A1* | 2/2005 | Purdy | 700/109 |
| 2005/0197721 A1* | 9/2005 | Chen et al. | 700/45 |
| 2006/0047356 A1* | 3/2006 | Funk et al. | 700/121 |
| 2006/0287755 A1* | 12/2006 | Kubli et al. | 700/145 |
| 2007/0026545 A1* | 2/2007 | Hwang et al. | 438/14 |
| 2007/0239285 A1* | 10/2007 | Good et al. | 700/1 |
| 2009/0171638 A1* | 7/2009 | Morisawa et al. | 703/7 |
| 2009/0299497 A1* | 12/2009 | Luko et al. | 700/29 |

OTHER PUBLICATIONS

Aftab A. Khan et al. "Virtual metrology and feedback control for semiconductor manufacturing process using recursive partial least squares", Jan. 29 2008, Journal of Process Control.*
Wu et al. "Performance Analysis of EWMA Controllers Subject to Metrology Delay", Aug. 2008, IEEE Transactions on Semiconductor Manufacturing, vol. 21, No. 3, pp. 413-425.*

* cited by examiner

*Primary Examiner* — Albert Decady
*Assistant Examiner* — Jason Lin
(74) *Attorney, Agent, or Firm* — Haynes and Boone, LLP (57) ABSTRACT

System and method for implementing wafer acceptance test ("WAT") advanced process control ("APC") are described. In one embodiment, the method comprises performing a key process on a sample number of wafers of a lot of wafers; performing a key inline measurement related to the key process to produce metrology data for the wafers; predicting WAT data from the metrology data using an inline-to-WAT model; and using the predicted WAT data to tune a WAT APC process for controlling a tuning process or a process APC process.

19 Claims, 9 Drawing Sheets

SYSTEM AND METHOD FOR IMPLEMENTING A WAFER ACCEPTANCE TEST ("WAT") ADVANCED PROCESS CONTROL ("APC") WITH NOVEL SAMPLING POLICY AND ARCHITECTURE

BACKGROUND

The present disclosure relates generally to Advanced Process Control ("APC") as applied to semiconductor fabrication and, more particularly, to system and method for implementing a wafer acceptance test ("WAT") APC with a novel sampling policy and architecture.

APC has become an essential component in semiconductor fabrication facilities ("fabs") for enabling continued improvement of device yield and reliability at a reduced cost. Significant elements of APC include integrated metrology, fault detection and classification, and run-to-run control. APC aids in reducing process variation as well as production costs. A key requirement for effective APC is that metrology tools are available to measure key parameters within an acceptable time frame. Additionally, methods must be provided for analyzing and interpreting measurement data. In practice, APC requires rich in-line measurements because the manufacturing processes are usually subjected to disturbance and drift caused by a variety of sources.

Similarly, wafer-level testing plays a crucial role in IC fabrication, particularly as the cost for post production processes increases. A defective wafer is identified by the processing and disposed of before it undergoes post-processing. A wafer acceptance test ("WAT") includes numerous testing items and is a vital part of the IC fabrication process. In a conventional foundry, WAT is performed as defined by a predetermined WAT model that specifies a number of test sites for wafers of a particular size. As advances have been made in IC fabrication, more specific testing has been required to determine product quality.

SUMMARY

One embodiment is a method for implementing wafer acceptance test ("WAT") advanced process control ("APC"). The method comprises performing a key process on a sample number of wafers of a lot of wafers; performing a key inline measurement related to the key process to produce metrology data for the wafers; predicting WAT data from the metrology data using an inline-to-WAT model; and using the predicted WAT data to tune a WAT APC process for controlling a tuning process or a process APC process.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The present disclosure relates generally to APC as applied to semiconductor fabrication and, more particularly, to system and method for implementing a WAT APC with a novel sampling policy and architecture.

It is understood, however, that specific embodiments are provided as examples to teach the broader inventive concept, and one of ordinary skill in the art can easily apply the teachings of the present disclosure to other methods and systems. Also, it is understood that the methods and systems discussed in the present disclosure include some conventional structures and/or steps. Since these structures and steps are well known in the art, they will only be discussed in a general level of detail. Furthermore, reference numbers are repeated throughout the drawings for the sake of convenience and example, and such repetition does not indicate any required combination of features or steps throughout the drawings.

In practice, APC is used not only to maintain stable processing conditions, but also to maintain high IC device quality. Conventionally, WAT APC is used to adjust device properties, which is typically independent of the process APC; however, in accordance with embodiments described hereinbelow, a methodology is presented for integrating WAT APC with process APC to enable more precise APC control.

Figure 1:
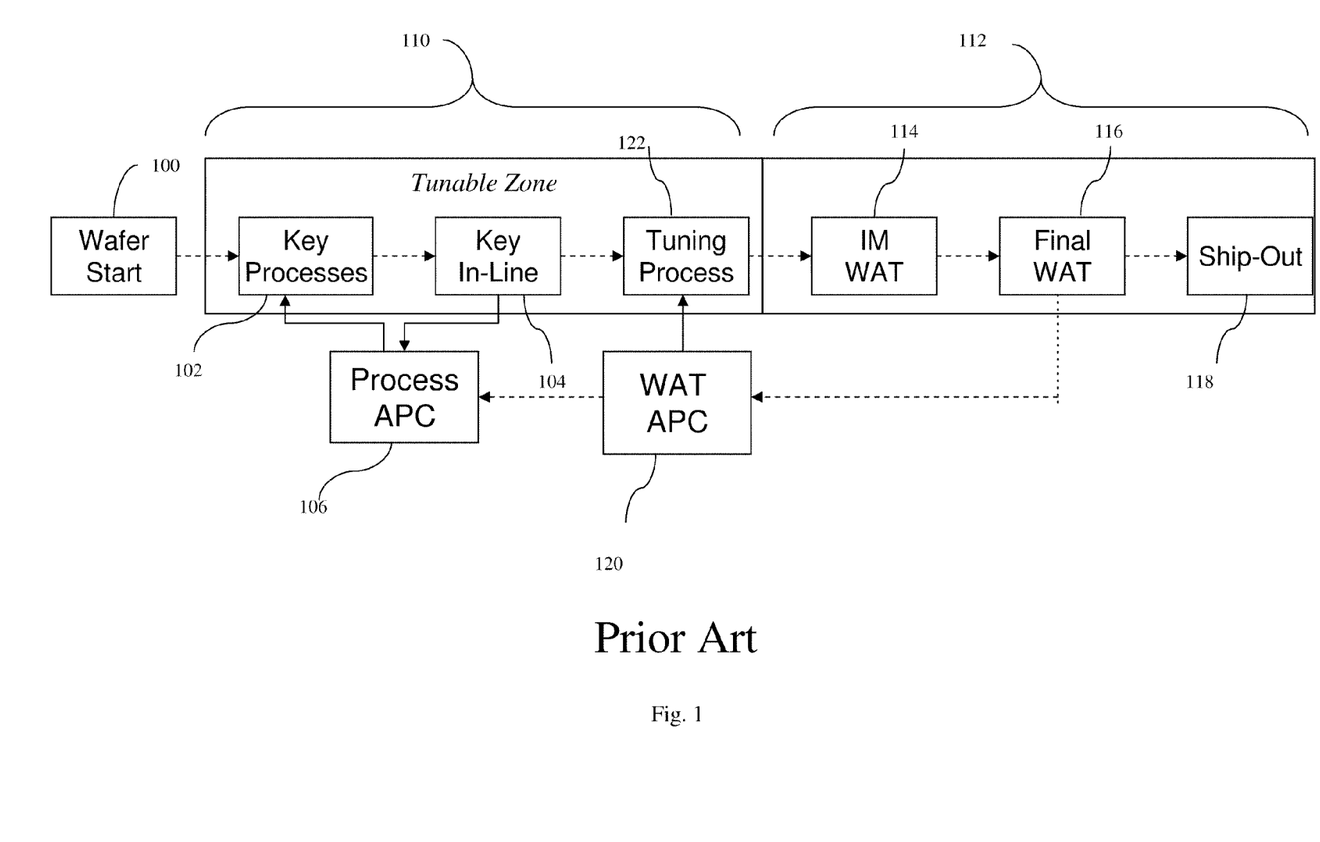
FIG. 1 is a block diagram illustrating a lifecycle of a lot of semiconductor wafers during a fabrication process in accordance with the prior art.

FIG. 1 illustrates a lifecycle of a lot of semiconductor wafers during a fabrication process in accordance with prior art. The process begins in a step 100. In step 102, a key process, which may comprise, for example, a photolithography process, an etching process, a deposition process, a chemical mechanical processing ("CMP") process, a coating process, a developing process, a thermal treatment process, or some other process, is performed on the wafers using appropriate process tools and/or computing devices, which may comprise processing, control, storage, display and/or input/output capabilities, as well as other equipment as necessary and appropriate to perform the respective functions thereof. In step 104, key in-line measurements are performed on a sample number of the wafers of the lot. It will be recognized that the measurements taken in step 104 comprise metrology data and are related to features created by the key process performed in step 102. For example, if the key process performed in step 102 is an etching process, then one of the key in-line measurements data from step 104 may be a trench depth measurement. The key in-line measurements made in step 104 are used to tune a process APC 106, which controls operation of the key process performed in step 102. In view of the fact that methods for tuning a process APC and using the process APC to control an associated process are well known to those having ordinary skill in the art, specific methods of accomplishing these tasks will not be discussed herein. Additionally, it will be recognized that, while only one of each of the key process step 102, key inline measurements step 104, and process APC 106 are shown in FIG. 1, multiple process steps and associated measurement steps and process APCs will likely be implemented during "front end" processing 110 of the wafers. During "back end" processing 112, in step 114, inter-metal ("IM") WAT is performed on sample number of wafers of the lot. Subsequently, and typically several weeks later, in step 116, final WAT is performed on all of the wafers and each wafer that passes the final WAT undergoes post processing and is shipped out in step 118. Results of the final WAT step 116 (i.e., "WAT data") are used to tune a WAT APC 120 in a conventional fashion, which WAT APC 120 in turn provides control signals to a tuning process step 122 and/or controller parameters about device electronic properties of the APC 106. The tuning process step 122 tunes the electrical properties of the subsequent wafers, for example, by performing an appropriate implant process to correct electrical properties of the wafer.

Figure 2:
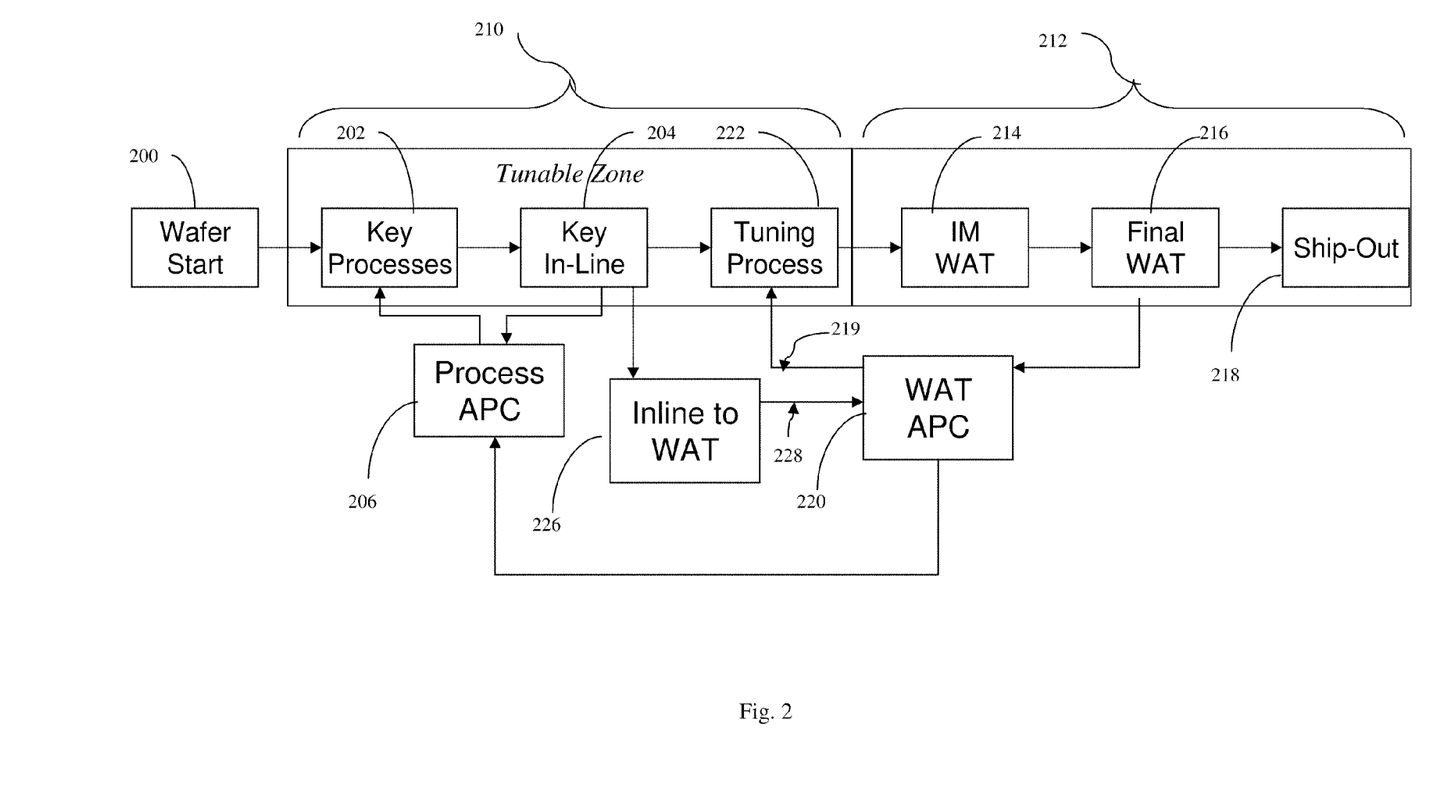
FIG. 2 is a block diagram illustrating a lifecycle of a lot of semiconductor wafers during a fabrication process in accordance with one embodiment.

FIG. 2 illustrates a lifecycle of a lot of semiconductor wafers during a fabrication process in accordance with one or more embodiments described herein. Similar to the process shown in FIG. 1, the process in FIG. 2 begins in step 200. In step 202, a key process, which may comprise, for example, a photolithography process, an etching process, a deposition process, a chemical mechanical processing ("CMP") process, a coating process, a developing process, a thermal treatment process, or some other process, is performed on the wafers. For purposes of illustration herein, it will be assumed that the key process is a poly etch process. In step 204, key in-line measurements on performed on a sample number of wafers of the lot. It will be recognized that the measurements made in step 204 comprise metrology data and are related to features created by the key process performed in step 202. For example, continuing with the previously cited example, if the key process performed in step 202 is a poly etch process, then one of the key in-line measurements taken in step 204 will likely be a poly gate CD ("poly_CD") measurement. The key in-line measurement data from step 204 is used to tune a process APC 206, which controls operation of the key process performed in step 202. In view of the fact that methods for tuning a process APC and using the process APC to control an associated process are well known to those having ordinary skill in the art, specific methods of accomplishing these tasks will not be discussed herein. It will be recognized that, while only one of each of the key process step 202, key inline measurements step 204, and process APC 206 are shown, multiple process steps and associated measurement steps and process APCs will likely be implemented during "front end" processing 210 of each lot of wafers.

During "back end" processing 212, in step 214, inter-metal ("IM") WAT is performed on a sample number of wafers of the lot. Subsequently, and typically several weeks later, in step 216, final WAT is performed on all of the wafers of the lot and each wafer that passes the final WAT undergoes post processing and is shipped out in step 218. WAT data from the final WAT step 216, as represented by a line 219, is used to tune a WAT APC 220, which provides control signals to a tuning process step 222 and/or controller parameters about device electronic properties of the APC 206 as will be described in greater detail below. It will be assumed for the sake of example that the WAT item of interest is saturation current ("$I_{SAT}$") and that the tuning process comprises a pocket implant process ("PKT").

In accordance with one embodiment, a relationship between inline measurement data and final WAT data is leveraged to predict final WAT data for the lot from the key inline measurement data. Therefore, in accordance with features of one embodiment, as will be described in detail, an inline-to-WAT module 226 is provided for predicting WAT data using the metrology data from the key inline measurement step 204. In particular, the inline-to-WAT module 226 defines a relationship between key inline measurements and final WAT data for the lot. The predicted WAT data, as represented by a line 228, along with the final WAT data 219 is used to tune the WAT APC 220. It will be recognized that predicted WAT data is available much sooner than final WAT results; therefore, a substantial benefit is realized through use of predicted WAT data to tune the WAT APC 220. As a result, precise process control can be provided to meet device requirements.

Figure 3A:
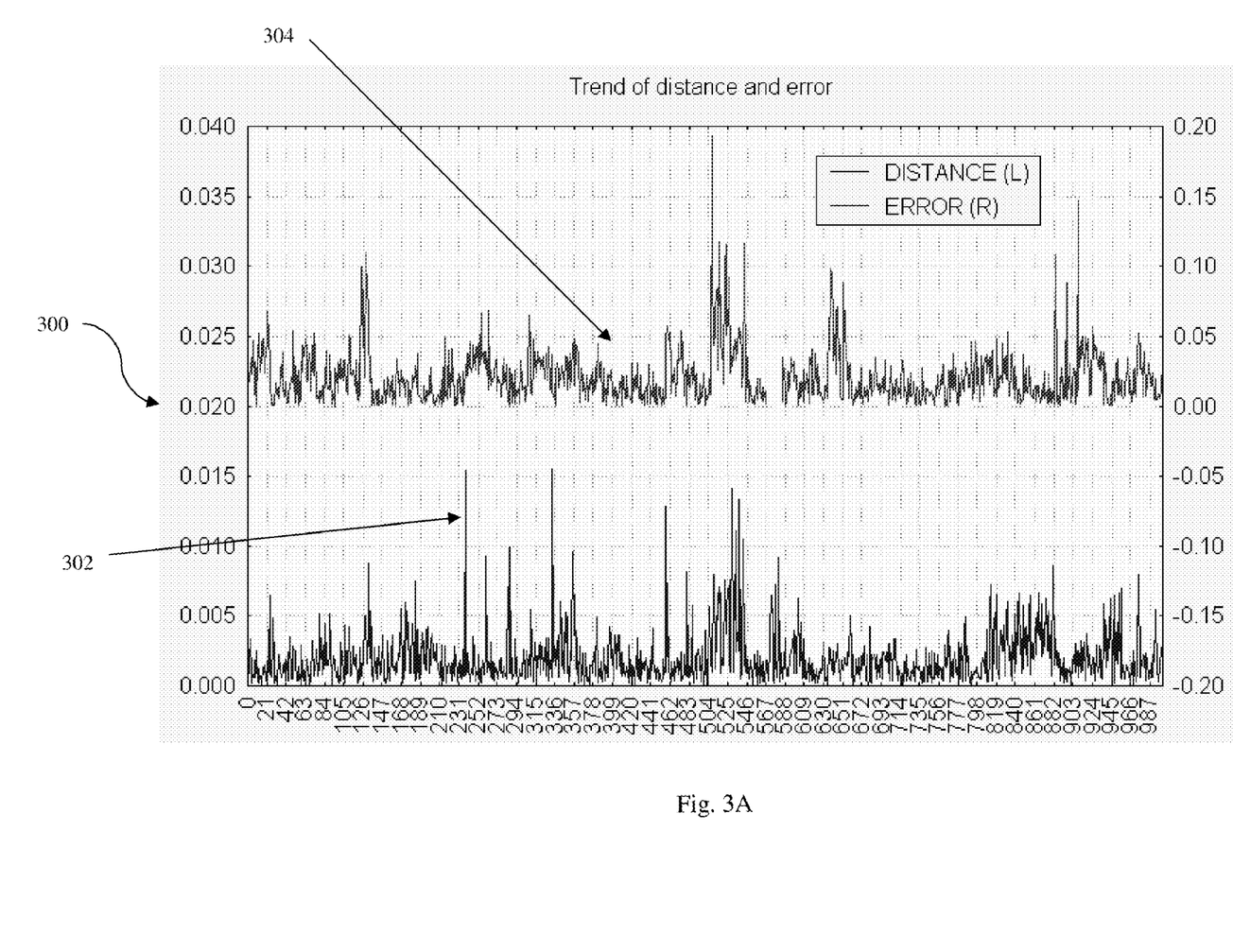
FIGS. 3A-3C are graphs illustrating a relationship between final WAT data and inline distance data in accordance with one embodiment.
Figure 3B:
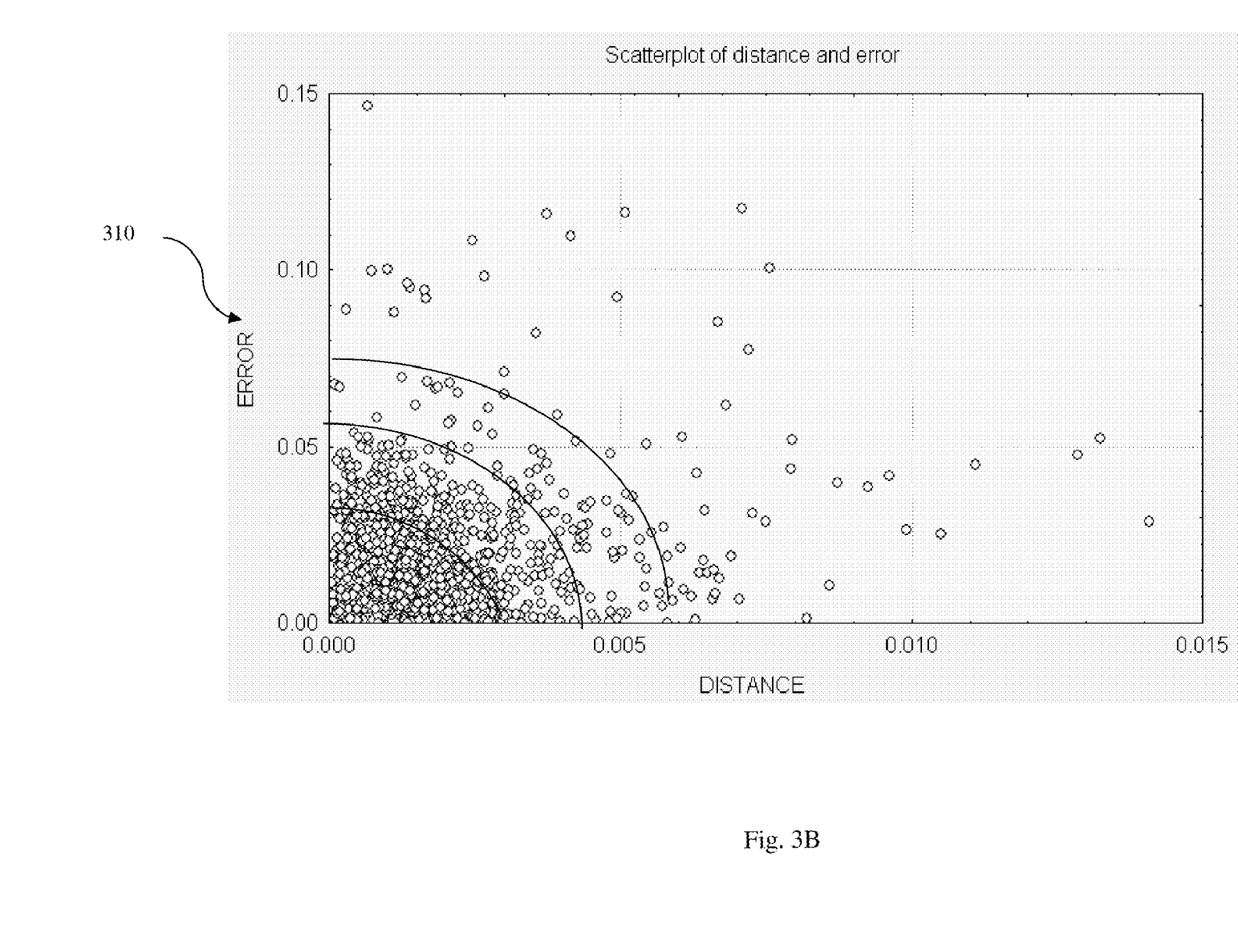
Figure 3C:
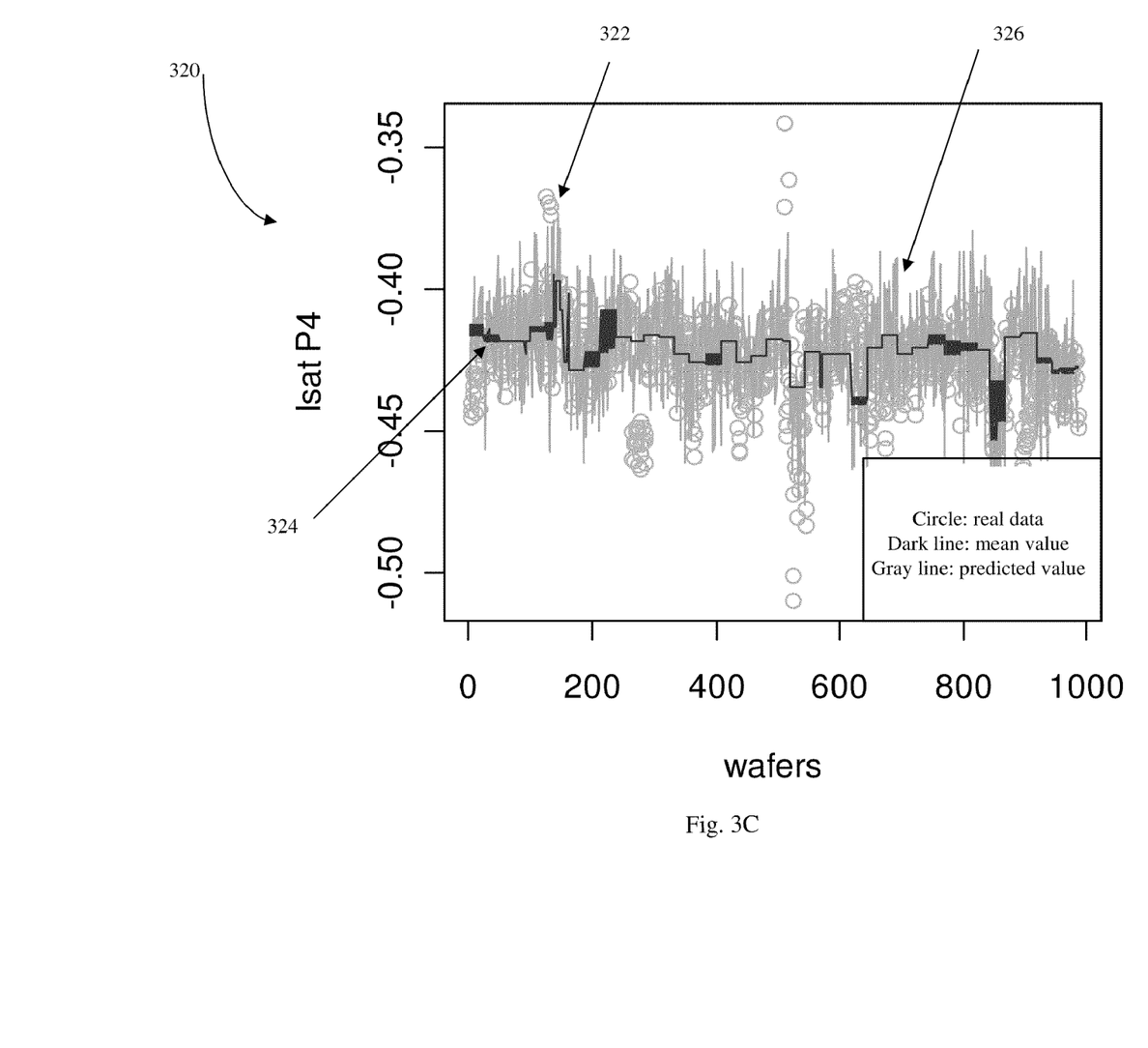

FIG. 3A illustrates a graph 300 showing a relationship between a normalized distribution of "inline distance" (i.e., the mean square root of the sum of all square errors between the inline measurement of a wafer and the mean inline measurement of a lot of wafers), as represented by a line 302, and a normalized distribution of final WAT data for the same lot, as represented by a line 304. The relationship between the distributions 302, 304, illustrated in the graph 300 form a co-normal distribution, as illustrated in FIG. 3B by a graph 310, in which the y-axis corresponds to final WAT data and the x-axis corresponds to inline distance. FIG. 3C illustrates a graph 320 showing final WAT versus inline distance across a plurality of wafers. In particular, shown in FIG. 3C, a set of data points 322 represents final WAT data for an item, such as $I_{SAT}$, per wafer. A line 324 represents mean WAT values of lots of wafer with same routing, and a line 326 represents predicted values with the routing model of the relationship between inline measurement and WAT. This model is the mean for the inline-to-WAT model.

As previously noted, in accordance with features described herein, in one embodiment, a WAT APC model is built using inline measurement as inputs thereto. In particular, a process model representing a key process can be represented in the inline-to-WAT module 226 by a function f( ) and the WAT model representing final WAT in the inline-to-WAT module 226 is g( ), then the WAT APC 220 can be designed as, e.g., $(g(f(\ )))^{-1}$ and the process APC 206 can be designed as, e.g., $(f(\ )+g(\ ))^{-1}$.

For example, in one embodiment, the WAT is tuned with the PKT implant through the variation of poly_CD. The WAT APC 220 is used to adjust the PKT implant tuning table based on the WAT shift. The adjusted tuning table is automatically built up using all of the metrology data and the routing model, e.g., poly_CD, tools of source-drain implant. In contrast, the process APC 206 is tuned using inline measurements to adjust etch time.

Figure 4A:
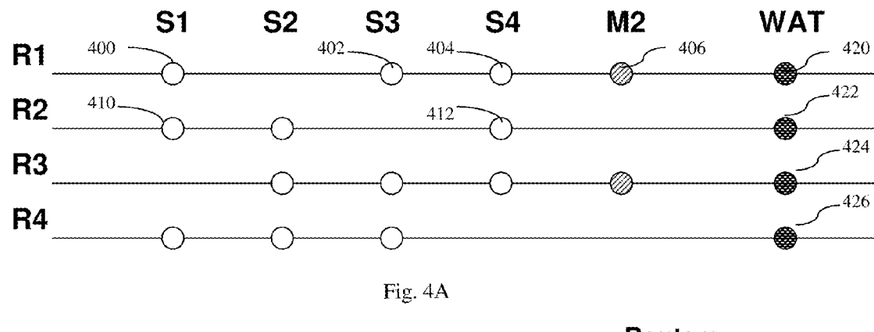
FIG. 4 illustrates a routing model implemented by embodiments described herein.
Figure 4B:
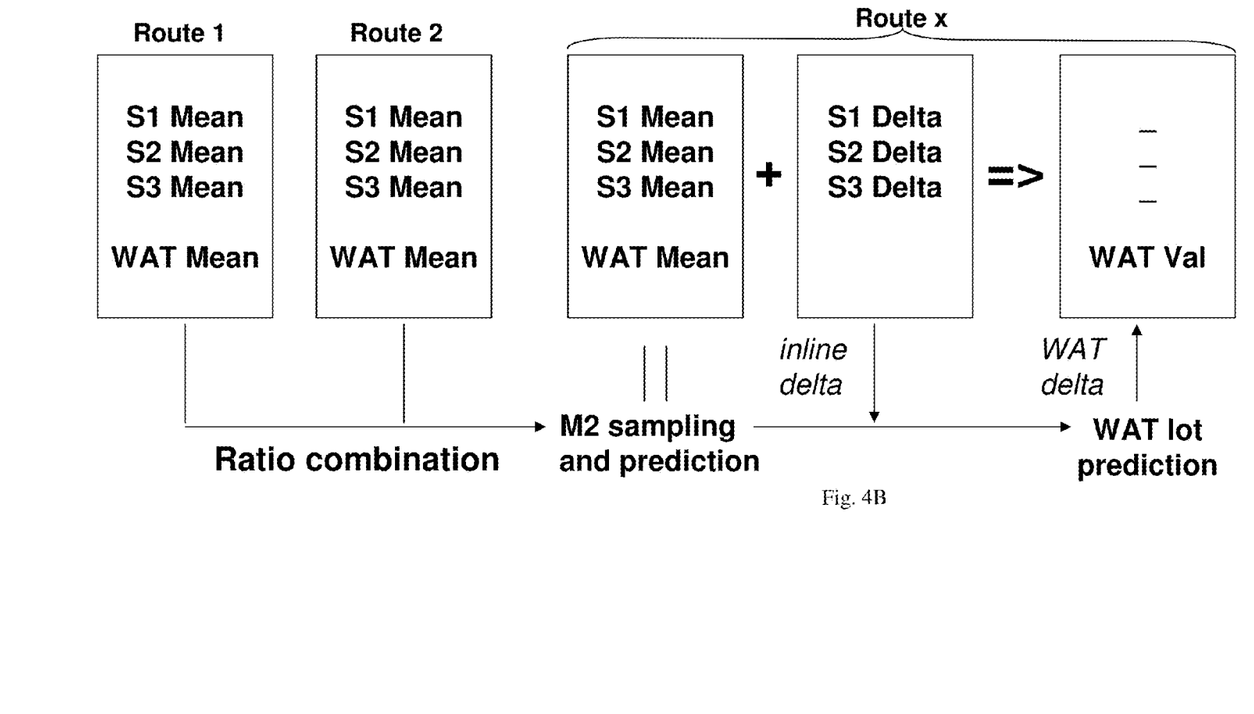

FIGS. 4A and 4B illustrate an inline-to-WAT model implemented by one or more embodiments described herein. As illustrated in FIG. 4A, one of multiple routes, represented by four routes R1-R4, is taken by each wafer through a plurality of processing stages, represented in FIG. 4 by four processing stages S1-S4, an IM WAT stage M2, and a final WAT stage, WAT. It will be understood that while a limited number of routes and stages are illustrated in FIG. 4A, it is anticipated that more routes and/or stages may actually be implemented. Sampling comprising key inline measurement at a particular stage for a particular route is represented by a circle disposed at the intersection of the route and stage. For example, for the route R1, inline measurement, or sampling, occurs at stages S1, S2, S4, and M2, as represented by circles 400, 402, 404, and 406, respectively. In contrast, with respect to the route R2, sampling occurs at stages S1 and S4, as represented by circles 410 and 412, respectively, but not at stage M2. It will be recognized that final WAT is performed for all routes R1-R4, as represented by circles 420-428, respectively.

Referring now to FIG. 4B, for a route X, for each stage, with a combination inputs of different mean inline measurement for stage (e.g., S1 Mean, S2 Mean, etc.) plus an inline delta determined for that stage (e.g., S1 Delta, S2 Delta, etc.), the output of the inline-to-WAT model is equal the WAT lot prediction for the route X. The combination rule of the different inputs depends on importance the stages, e.g., the effect of the stages on WAT. As shown in step 204 (FIG. 2), all key all key inline measurements are treated as inputs to the inline-to-WAT module 226, and the predicted WAT values are output to the WAT APC 220. The relationship between these inputs and outputs are illustrated in connection with FIGS. 3C, 4A, and 4B.

Figure 5:
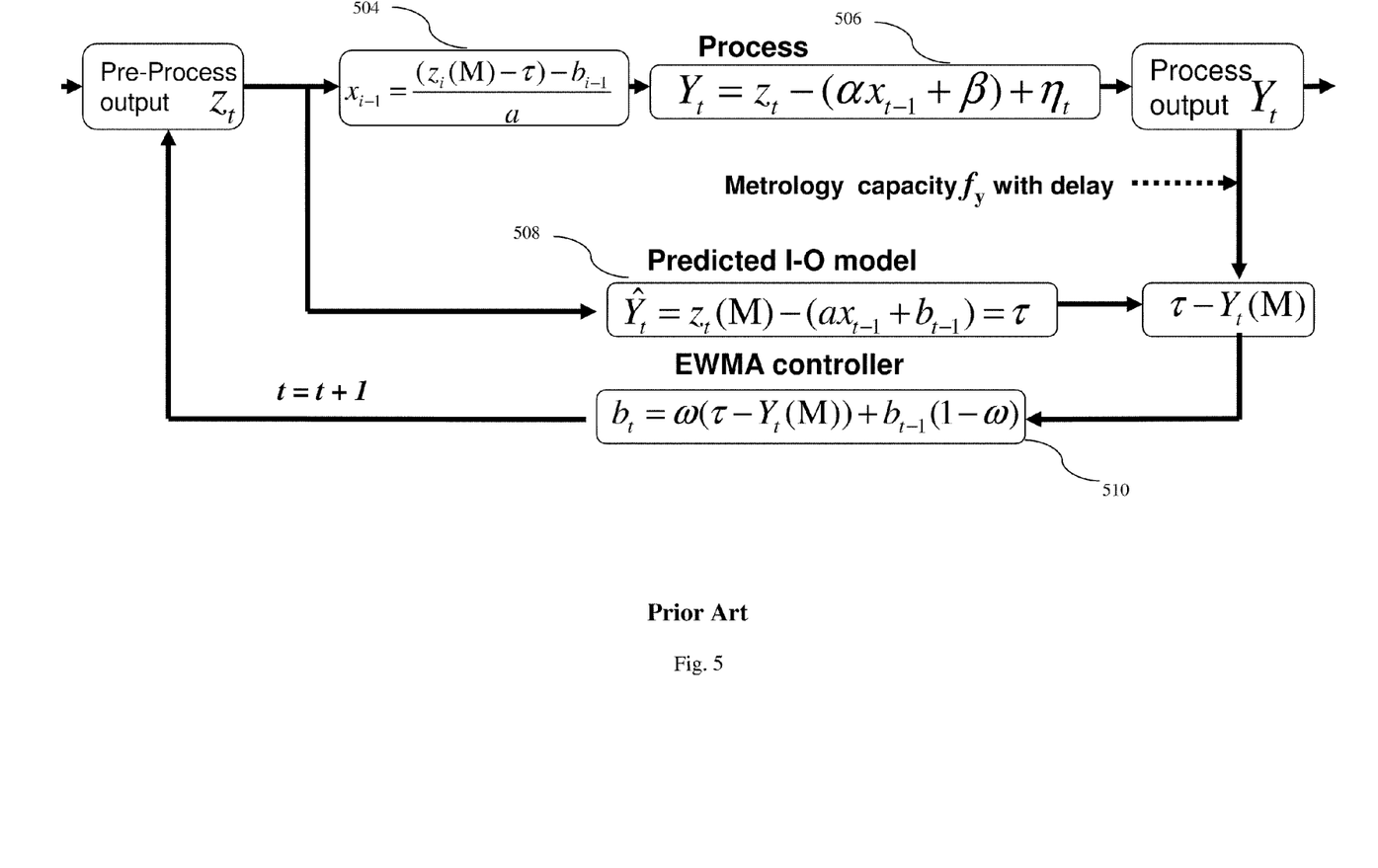
FIG. 5 illustrates a prior art methodology for using APC to control a stage of an IC fabrication process.

FIG. 5 illustrates a prior art methodology for using APC to control a stage of an IC fabrication process, which could be used in implementing the process APC 206 of FIG. 2. As shown in FIG. 5, a pre-process output $z_t$, which may represent, for example, a dimension before etching, is used to calculate an input variable $x_{t-1}$ (e.g., etch time) using an equation 504. In the equation 504, $z_t(M)$ represents the measured value of $z_t$, τ represents a control target, a represents a control parameter (such as etch rate), and $b_{t-1}$ represents a bias. A process output $Y_t$ is represented by an equation 506, in which α represents the actual value of the control parameter (e.g., etch rate) and β represents actual bias, neither of which are known, and η represents random error. Because the process represented by the equation 506 is a real process, the values of α, β, and η are not known. An equation 508 is a model of the process represented by the equation 506, in which each of the parameters is knowable and can be used to calculate τ, which is applied to an EWMA APC, represented by an equation 510. It will be noted that the equation 510 includes a discount factor ω, which is a constant selected by an engineer or other technician based on process experience. If there is a high impact event, such as a preventive maintenance ("PM") event, that downgrades the process capability index ("Cpk") of the APC, and there is no effective improvement caused by tuning APC parameters, then the discount factor ω will be manually adjusted based on experience.

Figure 6:
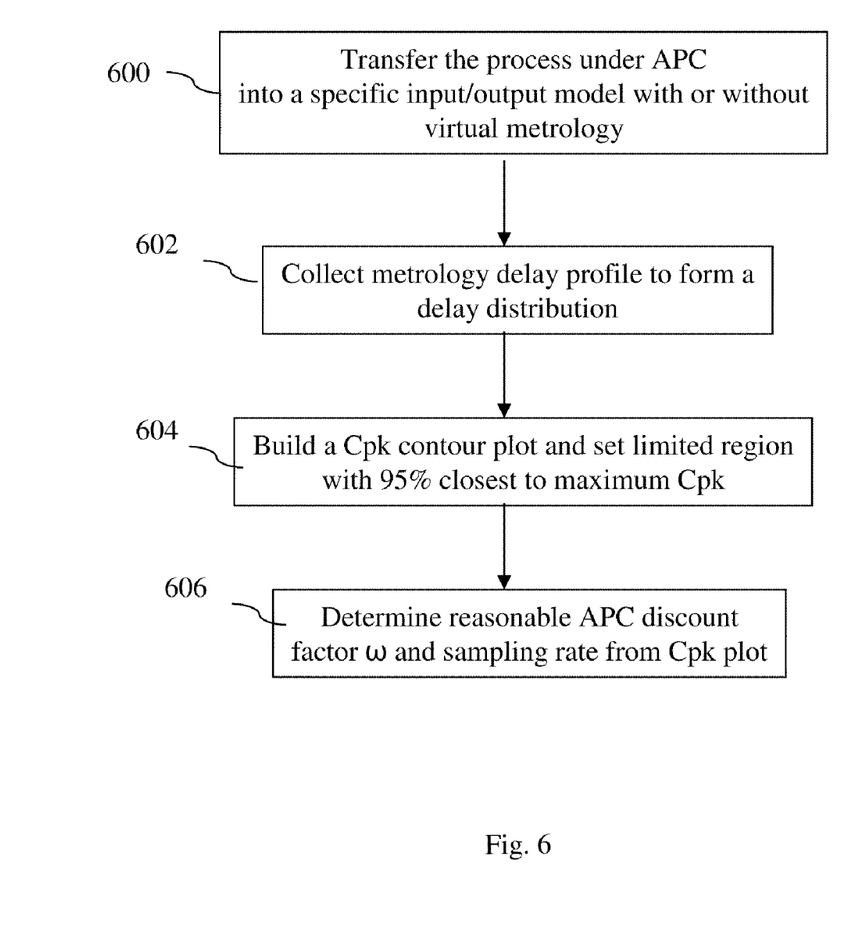
FIG. 6 is a flowchart of one embodiment for implementing a novel APC sampling policy.
Figure 7:
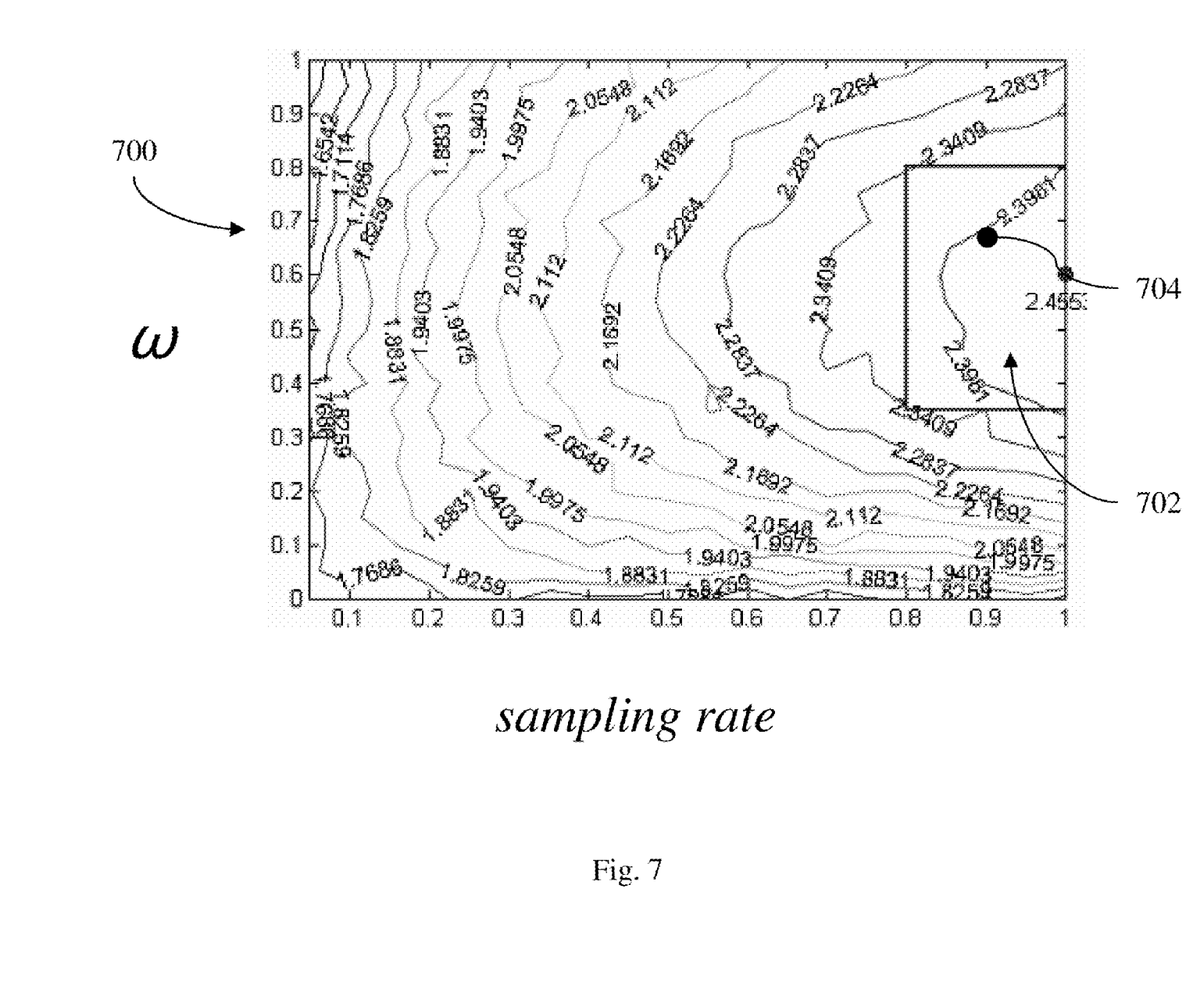
FIG. 7 illustrates a contour plot in connection with the sampling policy of FIG. 6.

It will be recognized that there will always exist some delay between step 220 and step 206 in FIG. 2. Therefore, the APC can be designed to take into account such delay as follows. FIG. 6 is a flowchart of one embodiment for implementing a novel APC sampling policy. In step 600, a process under APC control is transferred into a specific input/output model, which may or may not take advantage of VM. This I/O model is used to describe the behavior of the process to be sampled and could be built by simple linear regression or numerical simulation. In step 602, metrology delay data is collected to form a delay distribution. The delay data can be determined from the historical metrology records or engineers' experience. This historical delay data is transferred to a distribution that is meant for the delay distribution. In step 604, a Cpk model is constructed from the delay distribution, sampling rate, and discount factor ω. With a specific sample delay, a Cpk contour plot is built in a conventional fashion and a limited region comprising 95% closest to maximum Cpk is defined. Step 604 is best illustrated in FIG. 7, which shows a Cpk contour plot 700 in accordance with one embodiment wherein the selected region comprises a region 702. As will be recognized, each line of the Cpk contour plot corresponds to a different value of Cpk for the process to which the plot 700 corresponds. Returning to FIG. 6, in step 606, a reasonable APC discount factor ω and a corresponding sampling rate are determined from the Cpk plot 700. In particular, a point, such as a point 704, along a line corresponding to a Cpk of 0.3981, within the region 702 may be selected, corresponding to a discount factor ω of 0.7 and a sampling rate of 0.9. Accordingly, the process of interest is maximized by using these values.

Although only a few exemplary embodiments of this invention have been described in detail above, those skilled in the art will readily appreciate that many modifications are possible in the exemplary embodiments without materially departing from the novel teachings and advantages of this invention.

It is understood that various different combinations of the above-listed embodiments and steps can be used in various sequences or in parallel, and there is no particular step that is critical or required. Moreover, each of the processes depicted in the drawings can be implemented on multiple devices, including computing devices, and implementation of multiple ones of the depicted modules may be combined into a single device, including a computing device. Furthermore, features illustrated and discussed above with respect to some embodiments can be combined with features illustrated and discussed above with respect to other embodiments. Accordingly, all such modifications are intended to be included within the scope of this invention.

What is claimed is:

1. A method for implementing wafer acceptance test ("WAT") advanced process control ("APC"), the method comprising:
    performing a key process on a sample number of wafers of a lot of wafers, the key process represented by a first function f(x);
    performing a key inline measurement related to the key process to produce metrology data for the wafers, wherein the key inline measurement comprises a wafer measurement performed during wafer processing;
    predicting WAT data from the metrology data using an inline-to-WAT model, wherein the inline-to-WAT model is designed to represent a relationship between the metrology data and the predicted WAT data;
    determining a final WAT represented by a second function g(y); and
    using the predicted WAT data to tune a WAT APC process for controlling a tuning process according to a first model defined as $(g(f(x)))^{-1}$ and a process APC process according to a second model defined as $(f(x)+g(y))^{-1}$.

2. The method of claim 1 further comprising using final WAT data to tune the WAT APC process.

3. The method of claim 1 wherein the process APC process provides control signals to the key process.

4. The method of claim 1 wherein the key process is a poly etch process.

5. The method of claim 1 wherein the key inline measurement comprises a poly gate CD measurement.

6. The method of claim 1 further comprising selecting a number of wafers to be sampled using a sampling policy.

7. The method of claim 6 wherein the sampling policy comprises:
    transferring the key process into a specific input/output model;
    forming a delay distribution from a metrology delay profile;
    building a process capability index ("Cpk") contour plot and setting a limited region with 95% closest to maximum Cpk; and
    determining an APC discount factor and sampling rate from the within the limited region.

8. A system for implementing wafer acceptance test ("WAT") advanced process control ("APC"), the system comprising:
    means for performing a key process on a sample number of wafers of a lot of wafers, the key process represented by a first function f(x);
    means for performing a key inline measurement related to the key process to produce metrology data for the wafers, wherein the key inline measurement comprises a wafer measurement performed during wafer processing;

means for predicting WAT data from the metrology data using an inline-to-WAT model, wherein the inline-to-WAT model is designed to represent a relationship between the metrology data and the predicted WAT data;

means for determining a final WAT represented by a second function $g(y)$; and means for using the predicted WAT data to tune a WAT APC process for controlling a tuning process according to a first model defined as $(g(f(x)))^{-1}$ and or a process APC process according to a second model defined as $(f(x)+g(y))^{-1}$.

9. The system of claim 8 further comprising means for using final WAT data to tune the WAT APC process.

10. The system of claim 8 wherein the process APC process provides control signals to the key process.

11. The system of claim 8 wherein the key process is a poly etch process.

12. The system of claim 8 wherein the key inline measurement comprises a poly gate CD measurement.

13. The system of claim 8 further comprising means for selecting a number of wafers to be sampled using a sampling policy.

14. The system of claim 13 wherein the sampling policy comprises:

transferring the key process into a specific input/output model;

forming a delay distribution from a metrology delay profile;

building a process capability index ("Cpk") contour plot and setting a limited region with 95% closest to maximum Cpk; and determining an APC discount factor and sampling rate from the within the limited region.

15. A system for implementing wafer acceptance test ("WAT") advanced process control ("APC"), the system comprising:

a key process module for performing a key process on a sample number of wafers of a lot of wafers;

a metrology tool for performing a key inline measurement related to the key process to produce metrology data for the wafers, wherein the key inline measurement comprises a wafer measurement performed during wafer processing;

an inline-to-WAT module for predicting WAT data from the metrology data, wherein the inline-to-WAT module implements a model representing a relationship between the metrology data and the predicted WAT data;

a WAT APC module for receiving the predicted WAT data, the WAT APC process for controlling a tuning process or a process APC process; and a sampling policy for selecting a number of wafers to be sampled, wherein the sampling policy comprises:

transferring the key process into a specific input/output model;

forming a delay distribution from a metrology delay profile;

building a process capability index ("Cpk") contour plot and setting a limited region with 95% closest to maximum Cpk; and determining an APC discount factor and sampling rate from the within the limited region;

wherein the key process is represented by a first function $f(x)$ and a final WAT is represented by a second function $g(y)$, and wherein the WAT APC process for controlling the tuning process is performed according to a model defined as $(g(f(x)))^{-1}$.

16. The system of claim 15 further comprising wherein the WAT APC process receives final WAT data in addition to the predicted WAT data.

17. The system of claim 15 wherein the process APC process provides control signals to the key process.

18. The system of claim 15 wherein the key process is a poly etch process and the key inline measurement comprises a poly gate CD measurement.

19. The system of claim 15, wherein the process APC process is performed according to a model defined as $(f(x)+g(y))^{-1}$.

* * * * *